United States Patent [19]
Winter et al.

[11] 3,887,554
[45] June 3, 1975

[54] 2(4)-ANILINO- 4(2)-HYDROXY-6 H-s-TRIAZINO (2,1-b)-QUINAZOLINE-6-ONE

[75] Inventors: Roland A. E. Winter, Armonk, N.Y.; Thomas J. Villani, Danbury, Conn.

[73] Assignee: Ciba-Geigy Corporation, Ardsley, N.Y.

[22] Filed: Apr. 13, 1973

[21] Appl. No.: 351,127

Related U.S. Application Data

[63] Continuation-in-part of Ser. No. 129,128, March 29, 1971, abandoned.

[52] U.S. Cl.............................. 260/249.8; 424/249
[51] Int. Cl............................................. C07d 57/34
[58] Field of Search...................... 260/249.5, 249.8

[56] References Cited
UNITED STATES PATENTS

3,725,406  4/1973  Bose et al. .......................... 260/249.5

*Primary Examiner*—John M. Ford
*Attorney, Agent, or Firm*—Nestor W. Shust

[57] ABSTRACT

Compounds having the formula

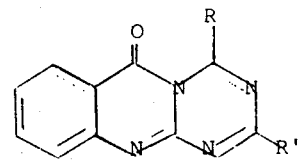

which can be used as cardiovascular agents or in preparing diazo dyestuffs.

4 Claims, No Drawings

2(4)-ANILINO-4(2)-HYDROXY-6 H-s-TRIAZINO (2,1-b)-QUINAZOLINE-6-ONE

This application is a continuation-in-part of Ser. No. 129,128, filed Mar. 29, 1971, now abandoned.

DETAILED DESCRIPTION

This invention relates to the compounds represented by the formula

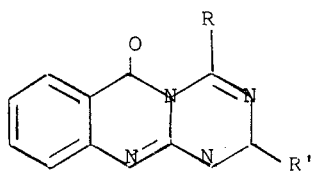

wherein R and R' are hydroxy or anilino groups provided that said R and R' are different.

The compounds of this invention are useful as cardiovascular agents, and particularly, as blood pressure lowering agents or as coronary and peripheral vascular dilation agents. When used in this capacity, they may be administered parenterally or orally in any of the usual pharmaceutical forms including tablets, capsules, powders, suspensions, syrups, and the like.

The following examples will further illustrate the nature of the present invention without introducing any limitations thereto.

EXAMPLE 1

2,4-dichloro-6-dimethylamino-s-triazine

A solution of cyanuric chloride (276.6 g, 1.5 moles) in 700 ml of hot acetone was added at once to a slurry of 1600 ml of water and 1200 g of crushed ice. With stirring 25% aqueous dimethylamine solution (318 ml, 1.65 moles) was added over a 20 minute period at +5°, followed by a solution of sodium hydroxide (60 g, 1.5 moles) in 60 ml of water over a 20 minute period at 5°. The mixture was stirred for 2 hours at the same temperature, filtered, washed thoroughly with water and recrystallized from 2.4 l., of heptane, yielding 236 g (81.5%) of 2,4-dichloro-6-dimethylamino-s-triazine as lustrous colorless flakes, m.p. 121°–122°, (lit. m.p. 119°–120°).

EXAMPLE 2

2,4-bis(o-carbomethoxyanilino)-6-dimethylamino-s-triazine

A mixture of 2,4-dichloro-6-dimethylamino-s-triazine, 28.9 g, 0.15 moles), methyl anthranilate (54.5 g, 0.36 moles), powdered anhydrous sodium carbonate (42.4 g, 0.4 moles) and 600 ml of toluene was heated at reflux with stirring for 70 hours. The hot reaction mixture was filtered and the salt residue washed with two 30 ml portions of toluene. After crystallization overnight at 0° the white precipitate was filtered, washed with four 25 ml portions of ethanol and dried overnight at 70° at 200 mm Hg, yielding 39.5 g (62%) of white crystalline 2,4-bis-(o-carbomethoxyanilino)-6-dimethylamino-s-triazine, m.p. 172°–173°. An analytical sample m.p. 173°–174° was obtained by recrystallization from dioxane-ethanol. Analysis Calculated for $C_{21}H_{22}N_6O_4$ (MW 422.4); Calculated:C, 59.70;H, 5.25;N, 19.90; Found:C, 59.59;H, 5.29N, 19.87.

EXAMPLE 3

2(4)-anilino-4(2)-hydroxy-6H-s-triazino[2,1-b]quinazolin-6-one

A mixture of 2,4-bis(o-carbomethoxyanilino)-6-dimethyl-amino-s-triazine, (21.12 g, 50 moles) and 200 ml of glacial acetic acid or propionic acid was heated at reflux for 16 hours. The yellow solution was cooled to room temperature. The insoluble white product (1.68 g) was washed with 50 ml of acetic acid and then recrystallized from hot N-methyl-pyrrolidone, washed with acetone and dried under reduced pressure yielding 2(4)-anilino-4(2)-hydroxy-6H-s-triazino[2,1-b]quinazolin-6-one, m.p. 435°–437° dec. Analysis Calculated for $C_{16}H_{11}N_5O_2$ (MW 305.3); Calculated:C, 62.95;H, 3.63;N, 22.94; Found:C, 62.49;H, 3.70;N, 23.08.

The compounds of this invention are also useful in the preparation of dyestuff materials. This can be accomplished by nitration of the benzenoid ring or rings employing standard nitration reactions. The nitro groups are then reduced to amino groups which in turn are converted into diazo dyestuffs by known coupling reactions.

What is claimed is:

1. A compound having the formula:

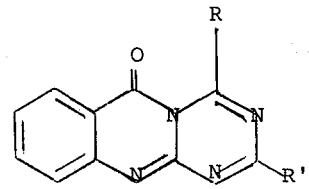

wherein R and R' are hydroxy or anilino groups provided that said R and R' are different.

2. The compound of claim 1 which is 2-anilino-4-hydroxy-6H-s-triazino[2,1-b]quinazolin-6-one.

3. The compound of claim 1 which is 4-anilino-2-hydroxy-6H-s-triazino-[2,1-b]quinazolin-6-one.

4. A mixture of the compounds of claim 1 which consists essentially of 2-anilino-4-hydroxy-6H-s-triazino[2,1-b]-quinazolin-6-one and 4-anilino-2-hydroxy-6H-s-triazino[2,1-b]quinazolin-6-one.

* * * * *